United States Patent
Goldberg et al.

(10) Patent No.: US 9,563,524 B2
(45) Date of Patent: Feb. 7, 2017

(54) MULTI LEVEL DATA RECOVERY IN STORAGE DISK ARRAYS

(71) Applicant: INTERNATIONAL BUSINESS MACHINES CORPORATION, Armonk, NY (US)

(72) Inventors: Itzhack Goldberg, Hadera (IL); Holger Martens, Lonsheim (DE); Thorsten Muehge, Budenheim (DE); Erik Rueger, Ockenheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

(21) Appl. No.: 14/567,966

(22) Filed: Dec. 11, 2014

(65) Prior Publication Data

US 2016/0170851 A1 Jun. 16, 2016

(51) Int. Cl.
*G06F 11/00* (2006.01)
*G06F 11/20* (2006.01)
*G06F 3/06* (2006.01)

(52) U.S. Cl.
CPC .......... *G06F 11/2069* (2013.01); *G06F 3/064* (2013.01); *G06F 3/065* (2013.01); *G06F 3/0619* (2013.01); *G06F 3/0689* (2013.01)

(58) Field of Classification Search
CPC ........ G06F 3/0619; G06F 3/064; G06F 3/065; G06F 3/0689; G06F 11/1076; G06F 11/1088; G06F 11/1092; G06F 11/1096; G06F 11/2069
See application file for complete search history.

(56) References Cited

U.S. PATENT DOCUMENTS

| | | | |
|---|---|---|---|
| 7,076,606 B2 | 7/2006 | Orsley | |
| 7,313,721 B2 | 12/2007 | Ashmore | |
| 7,827,351 B2 | 11/2010 | Suetsugu et al. | |
| 8,020,032 B2 | 9/2011 | Abali et al. | |
| 8,049,980 B1 * | 11/2011 | Emami | G11B 20/1833 360/31 |
| 8,065,558 B2 | 11/2011 | Zwisler et al. | |
| 8,417,989 B2 | 4/2013 | Kumar et al. | |
| 8,719,619 B2 | 5/2014 | Li et al. | |
| 2010/0306577 A1 * | 12/2010 | Dreifus | G11C 29/76 714/6.12 |

(Continued)

*Primary Examiner* — Joshua P Lottich
(74) *Attorney, Agent, or Firm* — Griffiths & Seaton PLLC

(57) ABSTRACT

Methods, computing systems and computer program products implement embodiments of the present invention that include arranging multiple storage devices as a RAID array and receiving, from a given storage device storing a dataset, a number of error messages exceeding a threshold. A mirrored subset of the dataset is retrieved from the given device, and a calculated subset of the dataset is retrieved from remaining devices in the RAID array. In a first embodiment, the mirrored subset is created first, and the calculated subset includes a relative complement of the mirrored subset with respect to the dataset. In a second embodiment, the calculated subset is created first, and the mirrored subset includes a relative complement of the calculated subset with respect to the dataset. The mirrored and the calculated datasets are stored to an additional storage device, and the given device is replaced with the additional device in the RAID array.

14 Claims, 5 Drawing Sheets

(56) References Cited

U.S. PATENT DOCUMENTS

| | | | |
|---|---|---|---|
| 2013/0007511 A1* | 1/2013 | Gaertner | G06F 11/1662 714/6.22 |
| 2013/0262921 A1* | 10/2013 | Gao | G06F 11/1092 714/6.24 |
| 2014/0208155 A1 | 7/2014 | Pan | |
| 2014/0215262 A1 | 7/2014 | Li et al. | |

* cited by examiner

MULTI LEVEL DATA RECOVERY IN STORAGE DISK ARRAYS

FIELD OF THE INVENTION

The present invention relates generally to RAID storage arrays, and specifically to recovering data from a storage device in the RAID storage array that is starting to fail.

BACKGROUND

Redundant array of independent disks (RAID) is a storage technology that combines multiple storage devices into a single logical unit. Data can be distributed across the multiple storage devices in one of several ways called "RAID levels", depending on what level of redundancy and performance is desired.

Common RAID levels implemented in storage systems include RAID 1, RAID 5, and RAID 6. In storage devices arranged as a RAID 1 array, an exact copy (or mirror) of each set of data is maintained on two storage devices, and in the event of a failure of one or the storage devices, the user data can be read directly from the remaining storage device in the RAID 1 array. In storage devices arranged as a RAID 5 array, a set of blocks storing user data and one corresponding block storing parity data are striped across three or more storage devices in the RAID 5 array, and in the event of a failure of one of the storage devices, the user data on the failed storage device can be reconstructed from the striped user data and parity data on the remaining storage devices in the RAID 5 array.

RAID 6 extends RAID 5 by adding one (or more) additional parity block(s). In other words, RAID 6 uses block-level striping with at least two parity blocks distributed across all the storage devices in the RAID 6 array. In the event of a failure of up to two of the storage devices in the RAID 6 array having two parity blocks, the user data on the one or two failed storage devices can be reconstructed from the striped user data and parity data on the remaining storage devices in the RAID 6 array.

The description above is presented as a general overview of related art in this field and should not be construed as an admission that any of the information it contains constitutes prior art against the present patent application.

SUMMARY

There is provided, in accordance with an embodiment of the present invention a method, including arranging multiple storage devices as a Redundant Array of Independent Disks (RAID) array, receiving, from a given storage device, a number of error messages exceeding a threshold, the given storage device storing a dataset, retrieving, from the given storage device, a mirrored subset of the dataset, retrieving, using remaining storage devices in the RAID array, the remaining storage devices comprising the multiple storage devices absent the given storage device, a calculated subset of the dataset, the dataset comprising a union of the mirrored and the calculated subsets, and creating, on an additional storage device not included in the multiple storage devices, a copy of the dataset using the mirrored and the calculated subsets.

There is also provided, in accordance with an embodiment of the present invention storage system, including multiple storage devices arranged as a Redundant Array of Independent Disks (RAID) array, one or more additional storage devices, and a processor configured to receive, from a given storage device in the RAID array, a number of error messages exceeding a threshold, the given storage device storing a dataset, to retrieve, from the given storage device in the RAID array, a mirrored subset of the dataset, to retrieve, using remaining storage devices in the RAID array, the remaining storage devices comprising the multiple storage devices absent the given storage device, a calculated subset of the dataset, the dataset comprising a union of the mirrored and the calculated subsets, and to create, on a given additional storage device not included in the multiple storage devices, a copy of the dataset using the mirrored and the calculated subsets.

There is further provided, in accordance with an embodiment of the present invention a computer program product, the computer program product including a non-transitory computer readable storage medium having computer readable program code embodied therewith, the computer readable program code including computer readable program code configured to arrange multiple storage devices as a Redundant Array of Independent Disks (RAID) array, computer readable program code configured to receive, from a given storage device, a number of error messages exceeding a threshold, the given storage device storing a dataset, computer readable program code configured to retrieve, from the given storage device, a mirrored subset of the dataset, computer readable program code configured to retrieve, using remaining storage devices in the RAID array, the remaining storage devices comprising the multiple storage devices absent the given storage device, a calculated subset of the dataset, the dataset comprising a union of the mirrored and the calculated subsets, and computer readable program code configured to create, on an additional storage device not included in the multiple storage devices, a copy of the dataset using the mirrored and the calculated subsets.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
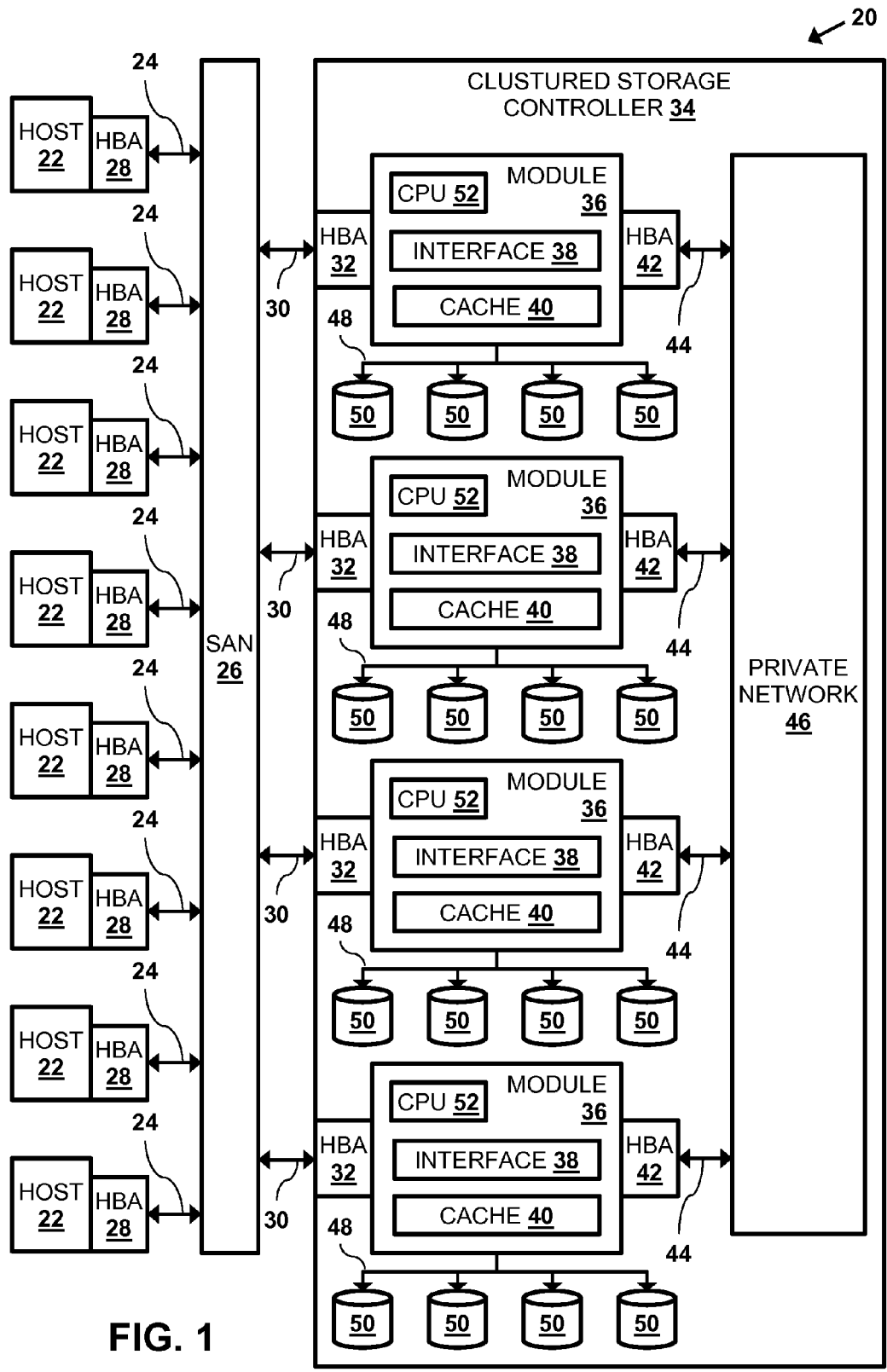
FIG. 1 is a block diagram that schematically illustrates a storage system comprising a storage controller, in accordance with an embodiment of the present invention.

When accessing multiple storage devices arranged in a Redundant Array of Independent Disks (RAID) configuration, receiving a specific number (i.e., a RAID error level threshold) of error messages from a given storage device may indicate that the given storage device is about to fail. For example, if the given storage device comprises a hard disk drive, the errors may include read errors, write errors and input/output (I/O) retries (i.e., in order to complete an I/O operation).

Embodiments of the present invention provide methods and systems for recovering a dataset from a RAID storage array upon detecting that a given storage device storing the dataset is about to fail. As described hereinbelow, two subsets of the dataset are retrieved from the RAID storage array, and are stored to an additional storage device. Upon storing the subsets to the additional storage device, the given storage device is replaced in the RAID array with the additional storage device.

In some embodiments, there may be multiple RAID error level thresholds indicating a current status of the given storage device. For example, a low error threshold may indicate that the storage device is still operational, but is starting to generate recoverable I/O errors. On the other hand, a high error threshold may indicate that the given storage device is in imminent danger of becoming totally unusable.

In embodiments described herein, the two subsets may comprise a mirrored subset and a calculated subset. The mirrored subset comprises data that can be retrieved directly from the given storage device, and the calculated subset comprises data that can be retrieved using RAID (i.e., parity) calculations based on user data and parity data stored in remaining storage devices in the RAID array (i.e., all the storage devices in the RAID array except for the given storage device that is failing). In embodiments herein, the mirrored subset may also referred to as a RAID 1 level copy of the given storage device and the calculated subset may also be referred to as a RAID 5 level copy of the given storage device. The mirrored and the calculated datasets include all data in the dataset stored on the given storage device (i.e., the dataset comprises a union of the mirrored and the calculated subsets).

In embodiments where the number of error messages reaches the low RAID error level threshold, but the given storage device is still fully operational, the mirrored subset can be created prior to the calculated subset. To create the mirrored subset, data can be retrieved from all storage regions on the given storage and stored to the mirrored subset. A storage region, also referred to herein as a partition, is a sequence of bytes having a specific length, typically one megabyte.

While creating the mirrored subset, a number of the storage regions (i.e., on the given storage device) whose data could not be successfully read are identified, the data from the number of identified storage regions can be generated, using RAID calculations, from corresponding storage regions on the remaining storage devices in the RAID array, and the generated data can be stored to the calculated dataset. Creating the mirrored subset prior to creating the calculated subset is described in detail in the description referencing FIG. 4 hereinbelow.

In embodiments where the number of error messages reaches the high RAID error level threshold and/or the given storage device is at least partially no longer operational, the calculated subset can be created prior to the mirrored subset. To create the calculated subset, data stored on the given storage device can be generated, using RAID calculations, from the remaining storage devices in the RAID array. While creating the calculated subset, a number of the storage regions (i.e., on the given storage device) whose data could not be successfully generated are identified, the data from the number of identified storage regions can be retrieved directly from given storage device, and the retrieved data can be stored to the mirrored dataset. Creating the calculated subset prior to creating the mirrored subset is described in detail in the description referencing FIG. 5 hereinbelow.

By recovering data on a failing drive using both the mirrored and the calculated subsets, systems implementing embodiments of the present invention can (a) increase data recovery speed, (b) reduce the risk of data loss during the recovery process, and (c) reduce the risk of data inconsistency between the dataset and the subsets.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor (also referred to herein as a central processing unit or a CPU) 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Raid Array Data Recovery

Figure 2:
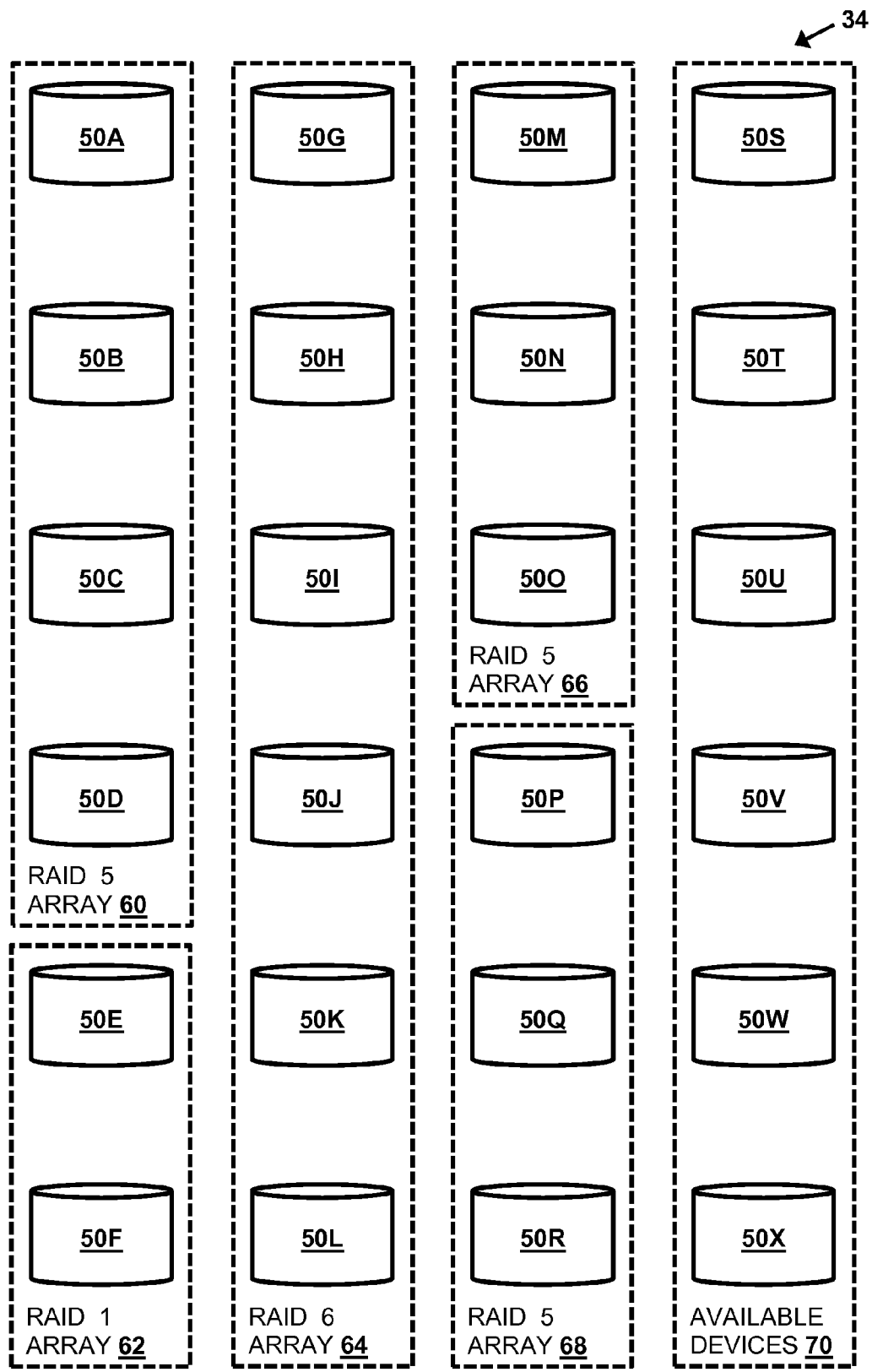
FIG. 2 is a block diagram that schematically illustrates storage devices in the storage controller arranged as multiple RAID arrays, in accordance with an embodiment of the present invention.

FIG. 2 is a block diagram that schematically illustrates storage devices 50 in storage controller 34 arranged as RAID arrays, in accordance with an embodiment of the present invention. In the example shown in FIG. 2, storage devices 50 can be differentiated by appending a letter to the identifying numeral, so that the storage devices comprise storage devices 50A-50X.

In the configuration shown in FIG. 2, storage devices 50A-50D are arranged as a RAID 5 array 60, storage devices 50E and 50F are arranged as a RAID 1 array 62, storage devices 50G-50L are arranged as a RAID 6 array 64, storage devices 50M-50O are arranged as a RAID 5 array 66, and storage devices 50P-50R are arranged as a RAID 5 array 68. In addition to RAID arrays 60-68, storage devices 50S-50X are assigned to an available storage device list (i.e., a "free list") 70. Available storage device list 70 references one or more storage devices 50 that are currently not allocated to any of the RAID arrays in storage controller 34.

Figure 3:
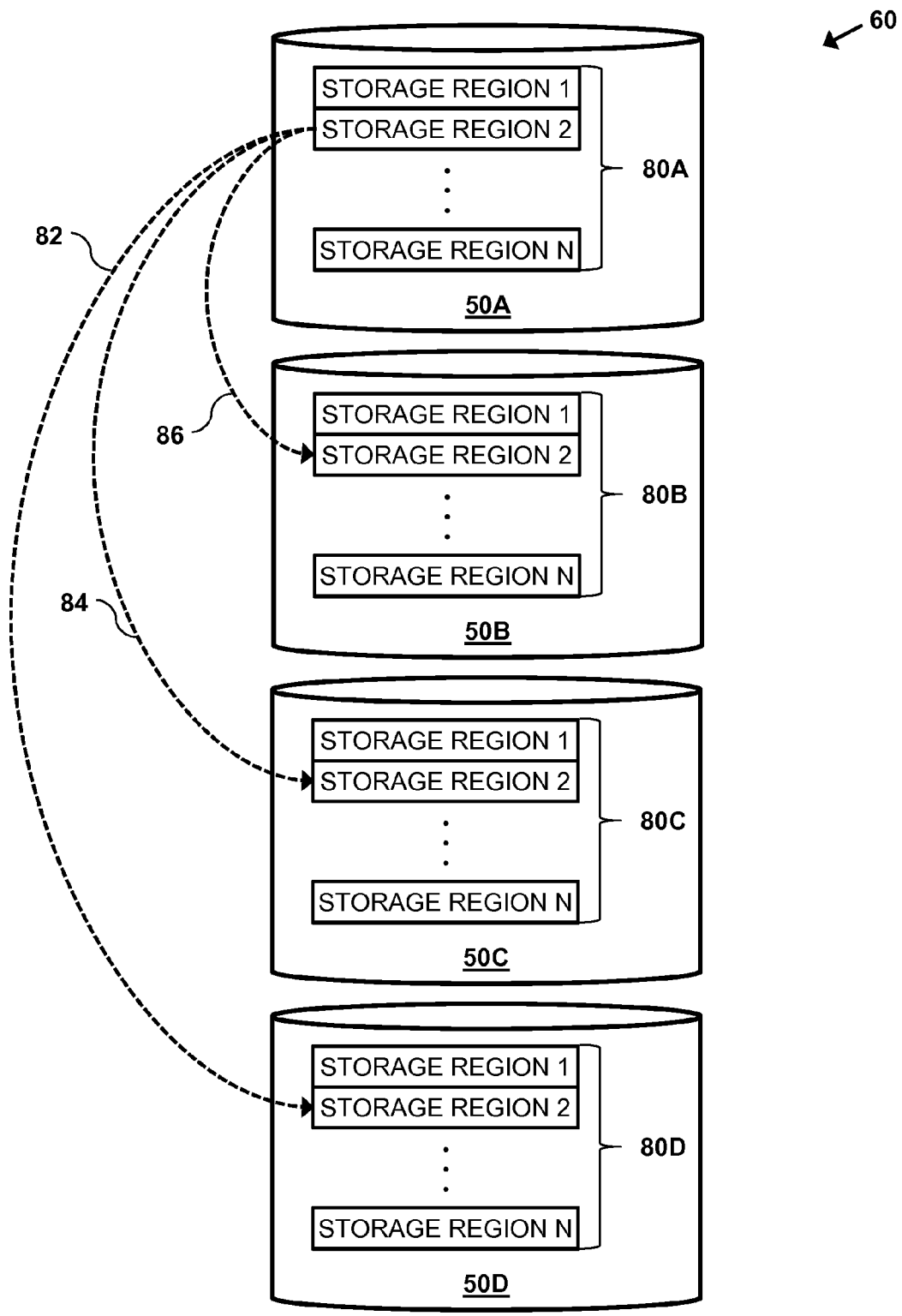
FIG. 3 is a block diagram that schematically illustrates corresponding storage regions in a set of the storage devices arranged as a RAID 5 array, in accordance with an embodiment of the present invention.

FIG. 3 is a block diagram that schematically illustrates corresponding storage regions 80 in storage devices 50A-50D arranged as RAID 5 array 60, in accordance with an embodiment of the present invention. In the configuration shown in FIG. 3, each storage device 50 in array 60 comprises multiple storage regions 80. In the example shown in FIG. 3, storage regions can be differentiated by appending a letter to the identifying numeral, so that the storage devices comprise storage devices 80A-80D, so that storage device 50A comprises storage regions 80A, storage device 50B comprises storage regions 80B, storage device 50C comprises storage regions 80C, and storage device 50D comprises storage regions 80D.

As indicated by arrows 82, 84 and 86, each given storage region 80 on a given storage device 50 in a given storage device 50 in RAID 5 array 60 has a corresponding storage regions 80 on the other storage devices in RAID 5 array 60. While FIG. 3 shows RAID 5 array 60 having corresponding storage regions 80 in storage devices 50A-50D, storage devices 50E-50X also comprise storage regions 80.

Figure 4:
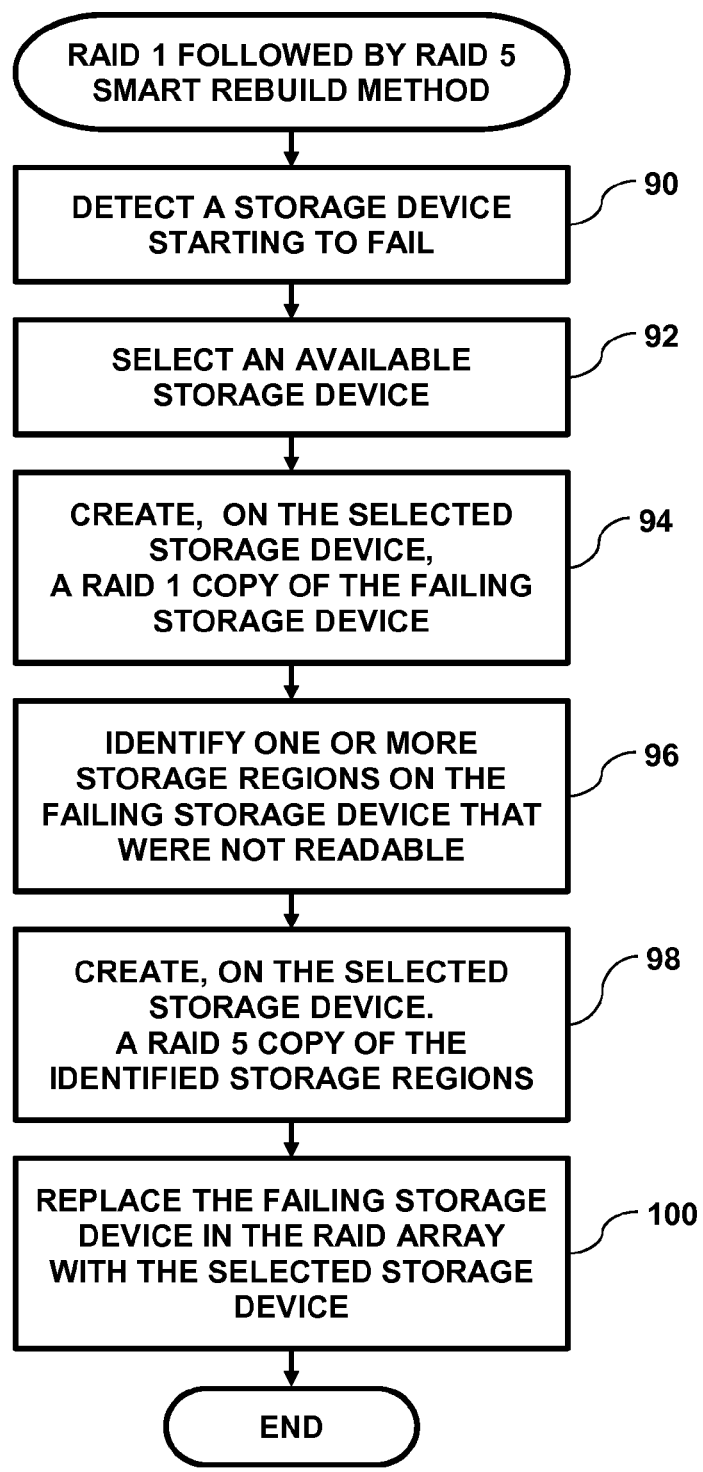
FIG. 4 is a flow diagram that schematically illustrates a method of recovering data from a given storage device in the RAID 5 array that is starting to fail, in accordance with a first embodiment of the preset invention.

FIG. 4 is a flow diagram that schematically illustrates a method of rebuilding data from a given storage device 50 in RAID 5 array 60 that is starting to fail, in accordance with a first embodiment of the preset invention. As described hereinbelow, the first embodiment of the present invention comprises first creating a RAID 1 level copy of the given storage device, and then creating a RAID 5 level copy of the given storage device. As explained in the flow diagram, the calculated subset (i.e., the RAID 5 level copy) comprises a relative complement of the mirrored subset (i.e., the RAID 1 level copy) with respect to the dataset stored on the given storage device. In the example described in the flow diagram, the given storage device comprises storage device 50B.

In a detection step 90, a given processor 52 detects that storage device 50B is about to fail. As described supra, the given processor can detect that storage device 50B is about to fail by receiving a number of error messages from the device that exceed a threshold.

In a select step 92, the given processor selects an additional storage device 50W from available storage device list 70 (i.e., the additional storage device comprises a given storage device 50 not included in RAID 5 array 60), and in a first create step 94, the given processor creates a RAID 1 level copy of storage device 50B on storage device 50W. To create the RAID 1 level copy, the given processor attempts copying data (i.e., both user data and parity data) stored in each storage region 80B to the corresponding storage region 80W.

Since storage device 80B may be starting to fail, in an identification step 96, the given processor identifies one or more storage regions 80B whose data could not be read, and was therefore not copied to corresponding storage regions 80W while creating the RAID 1 level copy in step 94. In a second create step 98, the given processor creates, on storage device 50W, a RAID 5 level copy of the one or more storage regions 80B identified in step 96. To create the RAID 5 level copy, for each given identified storage region 80B, the given processor retrieves user data and parity data stored in corresponding storage regions 80A, 80C and 80D, performs a calculation based on the retrieved user data and parity data to "recreate" data that was stored in the given identified storage region, and stores the recreated data on the corresponding storage region 80W.

In embodiments described herein, data stored on storage device 50B may be referred to as a dataset, the RAID 1 level copy of storage device 50B created on storage device 50W may be referred to as a "mirrored subset" of the dataset, and the RAID 5 level copy of storage device 50B created on storage device 50W may also be referred to as a "calculated subset" of the dataset. Therefore, by storing the RAID 1 and the RAID 5 copies of storage device 50B to storage device 50W, the given processor creates a copy of the given dataset by saving the mirrored and the calculated datasets to storage device 50W.

Finally, in a replacement step 100, the given processor replaces, in RAID 5 array 60, storage device 50B with storage device 50W, and the method ends. Upon replacing storage device 50B with storage device 50W, the given processor removes storage device 50W from available storage device list 70, and can mark storage device 50B as a failed device, thereby prompting a system administrator (not shown) to either reformat or replace storage device 50B in storage controller 34.

In embodiments where the given processor does not identify, in step 96, any storage regions 80B that could not be read, the given processor can skip step 98, since all the data on storage device 50B was successfully copied to storage device 50W in step 94. Alternatively, if the given processor could not successfully create the RAID 5 copy in step 98 (e.g., there was a given storage region 80A that could not be read), then the given processor can abort the rebuilding method described in FIG. 4, and alert the system administrator that the rebuild has failed.

Figure 5:
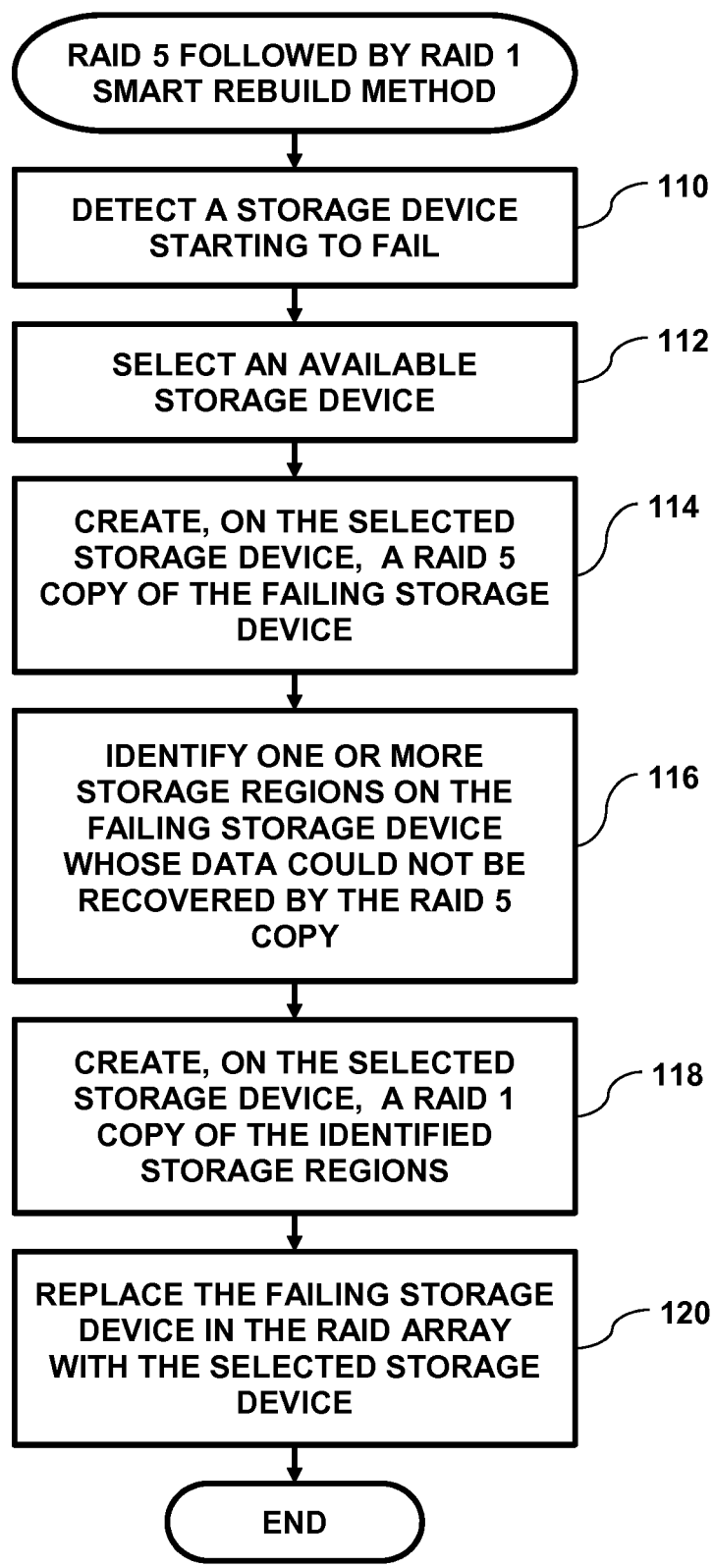
FIG. 5 is a flow diagram that schematically illustrates a method of recovering data from a given storage device in the RAID 5 array that is starting to fail, in accordance with a second embodiment of the preset invention.

FIG. 5 is a flow diagram that schematically illustrates a method of rebuilding data from a given storage device 50 in RAID 5 array 60 that is starting to fail, in accordance with a second embodiment of the preset invention. As described hereinbelow, the second embodiment of the present invention comprises first creating a RAID 5 level copy of the given storage device, and then creating a RAID 1 level copy of the given storage device. As explained in the flow diagram, the mirrored subset (i.e., the RAID 1 level copy) comprises a relative complement of the calculated subset (i.e., the RAID 5 level copy) with respect to the dataset stored on the given storage device. In the example described in the flow diagram, the given storage device comprises storage device 50B.

In a detection step 110, a given processor 52 detects that storage device 50B is about to fail, using embodiments described hereinabove. In a select step 112, the given processor selects storage device 50W from available storage device list 70, and in a first create step 114, the given processor creates a RAID 5 level copy of storage device 50B on storage device 50W. To create the RAID 5 level copy, for each given storage region 80B, the given processor attempts to retrieve user data and parity data stored in corresponding storage regions 80A, 80C and 80D, performs a calculation based on the retrieved user data and parity data to "recreate" data that was stored in the given identified storage region, and stores the recreated data on the corresponding storage region 80W.

In an identification step 116, the given processor identifies one or more storage regions 80B whose data could not be recreated (i.e., due to an inability to read data from one or more of corresponding storage regions 80A, 80C or 80D), and therefore could not copied to corresponding storage regions 80W while creating the RAID 5 level copy in step 114. In a second create step 118, the given processor creates, on storage device 50W, a RAID 1 level copy of the one or more storage regions 80B identified in step 116. To create the RAID 1 level copy, for each given storage region 80B identified in 116, the given processor copies data (i.e., both user data and parity data) stored in the given storage region 80B to the corresponding region 80W.

As described supra, data stored on storage device 50B may be referred to as a dataset, the RAID 1 level copy of storage device 50B created on storage device 50W may be referred to as a "mirrored subset" of the dataset, and the RAID 5 level copy of storage device 50B created on storage device 50W may also be referred to as a "calculated subset" of the dataset. Therefore, by storing the RAID 5 and the RAID 1 copies of storage device 50B to storage device 50W, the given processor creates a copy of the given dataset by saving the calculated and the mirrored datasets to storage device 50W.

Finally, in a replacement step 120, the given processor replaces, in RAID 5 array 60, storage device 50B with storage device 50W, and the method ends. Upon replacing storage device 50B with storage device 50W, the given processor removes storage device 50W from available storage device list 70, and can mark storage device 50B as a failed device, thereby prompting a system administrator (not shown) to either reformat or replace storage device 50B in storage controller 34.

In embodiments where the given processor does not identify, in step 116, any storage regions 80A, 80C or 80D that could not be read, the given processor can skip step 118, since all the data on storage device 50B was successfully recreated and copied to storage device 50W in step 114. Alternatively, if the given processor could not successfully create the RAID 1 copy in step 118 (i.e., there was a given storage region 80B that could not be read), then the given processor can abort the rebuilding method described in FIG. 5, and alert the system administrator that the rebuild has failed.

While the step in FIGS. 4 and 5 describe rebuilding, on storage device 50W, data stored in storage device 50B in RAID 5 array 60, using embodiments described herein to rebuild, on a first storage device 50 in available storage device list 70, data stored on a second storage device 50 that is part of a RAID array using parity information is considered to be within the spirit and scope of the present invention. For example, embodiments of the present invention can be used to rebuild, on storage device 50T, storage device 50P in RAID 5 array 68, or to rebuild, on storage device 50X, storage device 50J in RAID 6 array 64.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
arranging multiple storage devices as a Redundant Array of Independent Disks (RAID) array;
receiving, from a given storage device, a number of error messages exceeding a threshold, the given storage device storing a dataset;
retrieving, from the given storage device, a mirrored subset of the dataset;
retrieving, using remaining storage devices in the RAID array, the remaining storage devices comprising the multiple storage devices absent the given storage device, a calculated subset of the dataset, the dataset comprising a union of the mirrored and the calculated subsets; and
creating, on an additional storage device not comprised in the multiple storage devices, a copy of the dataset using the mirrored and the calculated subsets; wherein each of the storage devices in the RAID array have corresponding storage regions, and wherein retrieving the calculated subset comprises successfully retrieving user data and parity data from a first number of the corresponding storage regions in each of the remaining storage devices in the RAID array, calculating values based on the successfully retrieved user and parity data, storing the calculated values to the calculated subset, and identifying a second number of the corresponding storage regions whose data could not be successfully retrieved; and wherein retrieving the mirrored subset comprises retrieving, for each of the second number of the corresponding storage regions, data from the corresponding storage region in the given storage device, and storing, to the mirrored subset, the data retrieved from the given storage region.

2. The method according to claim 1, and comprising replacing, in the RAID array, the given storage device with the additional storage device upon creating the copy of the dataset on the additional storage device.

3. The method according to claim 1, wherein each of the multiple and the additional storage devices is selected from a list consisting of a hard disk drive and a solid-state disk drive.

4. The method according to claim 1, wherein each of the storage devices in the RAID array have corresponding storage regions, and wherein retrieving the mirrored subset comprises retrieving data from a first number of the storage regions on the given storage device that are readable, storing the retrieved data to the mirrored subset, and identifying a second number of the storage regions on the given storage device that are unreadable.

5. The method according to claim 4, wherein retrieving the calculated subset comprises retrieving, for each of the second number of the storage regions, user data and parity data from corresponding storage regions on the remaining storage devices in the RAID array, calculating a value based on the user and the parity data retrieved from the corresponding storage regions on the remaining storage devices in the RAID array, and storing the calculated value to the calculated subset.

6. A storage system, comprising:
multiple storage devices arranged as a Redundant Array of Independent Disks (RAID) array;
one or more additional storage devices; and
a processor configured:
to receive, from a given storage device in the RAID array, a number of error messages exceeding a threshold, the given storage device storing a dataset;
to retrieve, from the given storage device in the RAID array, a mirrored subset of the dataset;
to retrieve, using remaining storage devices in the RAID array, the remaining storage devices comprising the multiple storage devices absent the given storage device, a calculated subset of the dataset, the dataset comprising a union of the mirrored and the calculated subsets; and
to create, on a given additional storage device not comprised in the multiple storage devices, a copy of the dataset using the mirrored and the calculated subsets; wherein each of the storage devices in the RAID array have corresponding storage regions, and wherein the processor is configured to retrieve the calculated subset by successfully retrieving user and parity data from a first number of the corresponding storage regions in each of the remaining storage devices in the RAID array, calculating values based on the successfully retrieved user and parity data, storing the calculated values to the calculated subset, and identifying a second number of the corresponding storage regions whose data could not be successfully retrieved; and wherein the processor is configured to retrieve the mirrored subset by retrieving, for each of the second number of the corresponding storage regions, data from the corresponding storage region in the given storage device, and storing, to the mirrored subset, the data retrieved from the given storage region.

7. The storage system according to claim 6, wherein the processor is configured to replace, in the RAID array, the given storage device with the additional storage device upon creating the copy of the dataset on the additional storage device.

8. The storage system according to claim 6, wherein each of the multiple and the additional storage devices is selected from a list consisting of a hard disk drive and a solid-state disk drive.

9. The storage system according to claim 6, wherein each of the storage devices in the RAID array have corresponding storage regions, and wherein the processor is configured to retrieve the mirrored subset by retrieving data from a first number of the storage regions on the given storage device that are readable, storing the retrieved data to the mirrored subset, and identifying a second number of the storage regions on the given storage device that are unreadable.

10. The storage system according to claim 9, wherein the processor is configured to retrieve the calculated subset by retrieving, for each of the second number of the storage regions, user data and parity data from corresponding storage regions on the remaining storage devices in the RAID array, calculating a value based on the user and the parity data retrieved from the corresponding storage regions on the remaining storage devices in the RAID array, and storing the calculated value to the calculated sub set.

11. A computer program product, the computer program product comprising:

a non-transitory computer readable storage medium having computer readable program code embodied therewith, the computer readable program code comprising:

computer readable program code configured to arrange multiple storage devices as a Redundant Array of Independent Disks (RAID) array;

computer readable program code configured to receive, from a given storage device, a number of error messages exceeding a threshold, the given storage device storing a dataset;

computer readable program code configured to retrieve, from the given storage device, a mirrored subset of the dataset;

computer readable program code configured to retrieve, using remaining storage devices in the RAID array, the remaining storage devices comprising the multiple storage devices absent the given storage device, a calculated subset of the dataset, the dataset comprising a union of the mirrored and the calculated subsets; and computer readable program code configured to create, on an additional storage device not comprised in the multiple storage devices, a copy of the dataset using the mirrored and the calculated subsets; wherein each of the storage devices have corresponding storage regions, and wherein the computer readable program code is configured to retrieve the calculated subset by successfully retrieving user and parity data from a first number of the corresponding storage regions in each of the remaining storage devices in the RAID array, calculating values based on the successfully retrieved user and parity data, storing the calculated values to the calculated subset, and identifying a second number of the corresponding storage regions whose data could not be successfully retrieved; and wherein the computer readable program code is configured to retrieve the mirrored subset by retrieving, for each of the second number of the corresponding storage regions, data from the corresponding storage region in the given storage device, and storing, to the mirrored subset, the data retrieved from the given storage region.

12. The computer program product according to claim 11, and comprising computer readable program code configured to replace, in the RAID array, the given storage device with the additional storage device upon creating the copy of the dataset on the additional storage device.

13. The computer program product according to claim 11, wherein each of the storage devices in the RAID array have corresponding storage regions, and wherein the computer readable program code is configured to retrieve the mirrored subset by retrieving data from a first number of the storage regions on the given storage device that are readable, storing the retrieved data to the mirrored subset, and identifying a second number of the storage regions on the given storage device that are unreadable.

14. The computer program product according to claim 13, wherein the computer readable program code is configured to retrieve the calculated subset by retrieving, for each of the second number of the storage regions, user data and parity data from corresponding storage regions on the remaining storage devices in the RAID array, calculating a value based on the user and the parity data retrieved from the corresponding storage regions on the remaining storage devices in the RAID array, and storing the calculated value to the calculated subset.

* * * * *